UNITED STATES PATENT OFFICE.

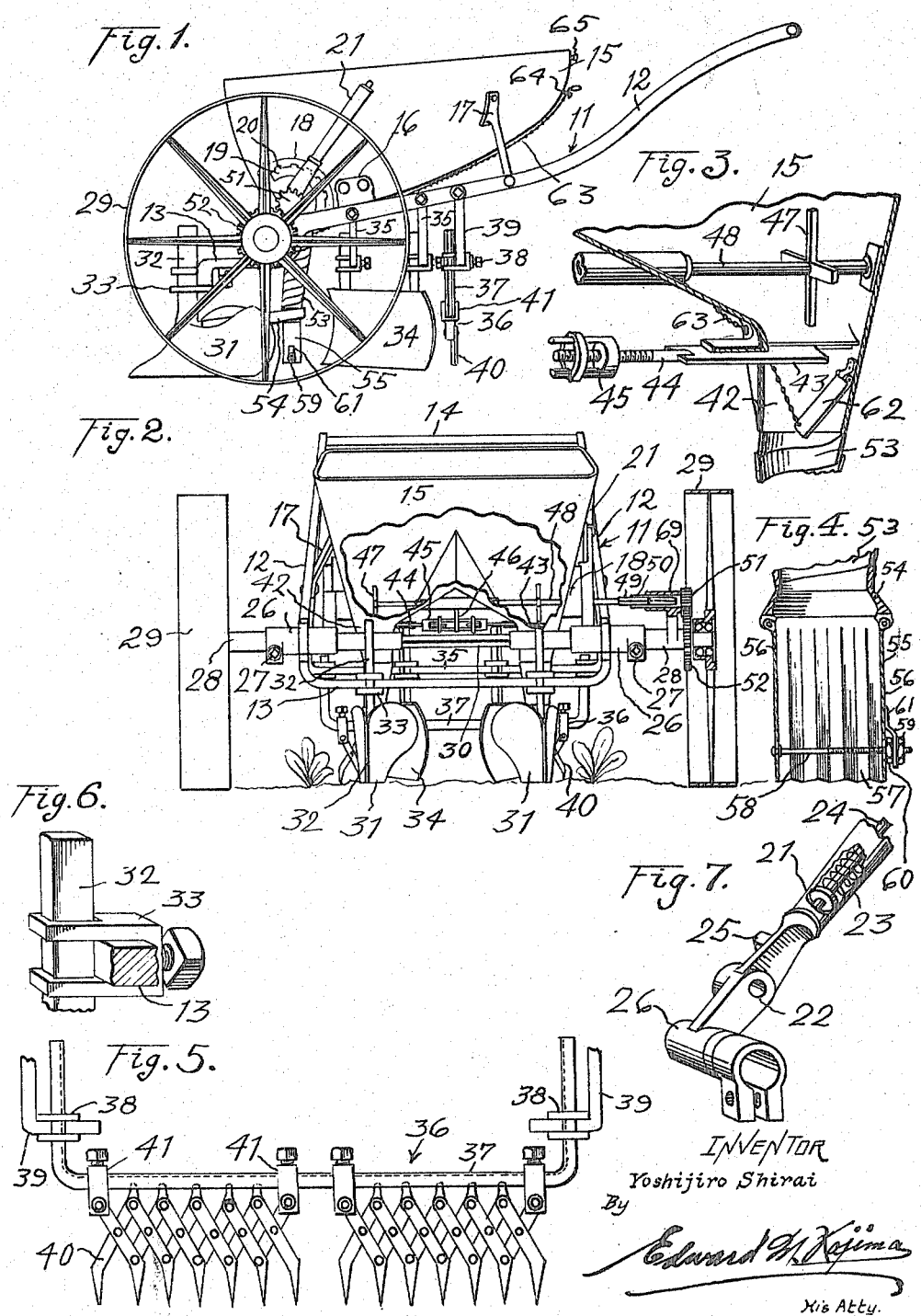

YOSHIJIRO SHIRAI, OF EL MONTE, CALIFORNIA.

MANURE-SPREADER.

1,286,430. Specification of Letters Patent. Patented Dec. 3, 1918.

Application filed April 8, 1918. Serial No. 227,343.

*To all whom it may concern:*

Be it known that I, YOSHIJIRO SHIRAI, a subject of the Emperor of Japan, residing at El Monte, in the county of Los Angeles and State of California, have invented a new and useful Manure-Spreader, of which the following is a specification.

This invention relates to agricultural implements, and more particularly to garden implements which are used particularly for the cultivation of gardens wherein only hand implements may be employed.

The objects of the invention are to simplify and improve the construction of implements adapted to cultivate the soil, and to provide an improved device for simultaneously dropping and spreading a fertilizer and also covering the same, and for stirring and pulverizing the soil, and turning the same upon the distributed fertilizer; and with these ends in view the invention consists in the improved construction and novel arrangement and combination of parts which will be hereinafter fully described and particularly pointed out in the claims.

In the accompanying drawings has been illustrated a simple and preferred form of the invention, it being understood that no limitation is necessarily made to the precise structural details therein exhibited, but that the right is reserved to any changes, alterations, or modifications to which recourse may be had within the scope of the invention, and without departing from the spirit or sacrificing the efficiency of the same.

Other objects are to provide means for adjusting the device relative to the depth of ground to be turned for cultivation, to adjust the device relative to the width and character of the rows of plants cultivated, and to otherwise adjust the device for satisfactorily turning and tilling the ground and fertilizing the same.

Other objects and advantages may appear from the subjoined detail description.

In the drawings, Figure 1 is a side elevation of a manure spreader constructed in accordance with my invention. Fig. 2 is a front elevation of the same. Fig. 3 is a fragmental and perspective detail showing the means for cutting off and for regulating the distribution of the fertilizer. Fig. 4 is a fragmental and sectional detail of the nozzle for distributing the fertilizer, showing means for adjustment. Fig. 5 is a detail side elevation of the rake, illustrating the means for adjustment. Fig. 6 is a perspective detail view showing the clamping means for adjustment of the plow, scraper, and rake. Fig. 7 is a perspective detail view of the lever which adjusts the wheels and axles relative to the frame and body of the device.

Referring to the drawings, my improved manure spreader consists of a frame 11, having the side-bars 12, the front bar 13, and the rear handle-bar 14, and the receptacle 15, carried by the frame; being fixed to the frame 11 by connecting brackets 16, 17. Attached to the receptacle, are the bearings 18, provided with a segmental groove 19, having therein the notches 20. Levers 21, are journaled in the bearings 18, the levers having concentric bearings 22, and are provided with handles 23, having working therein the plungers 24, which are spring actuated and provided with a lug 25, to engage the notches 20, in the segmental groove 19. The levers 21 are further provided with angularly disposed sleeves 26, provided with clamping means 27, and adapted to carry the non-rotating axle members 28, on which are mounted the main wheels 29. By this arrangement the axles are made transversely adjustable to vary the distance between the wheels, and thus adjust the same in accordance with the rows of plants which are to be cultivated. An angular axle member 30 is arranged to telescope within the axle members 28, and thereby maintain the alinement of the wheels relative to one another. Vertical adjustment of the wheels is attained by manipulation of the levers 21, and this arrangement will provide adjustment for varying the relative operative position of the cultivating attachments.

The plow elements 31 are provided for turning the soil preparatory to distributing the fertilizer thereon; the combined standard and plow share 32, being adjustably secured to the frame bar 13, by clamps 33, as shown in Fig. 6. Clamps 33 will allow vertical and transverse adjustment of the plow elements, providing for variation in width of rows of the plants which are to be cultivated. At the rear of the plow elements, are mounted the scraper elements 34, which are clamped to transverse bars 3 extending beneath the device; two of bars 35 being provided, so that the scraper may be adjusted vertically and angularly relative to the frame. At the rear of the scraper elements are mounted the rakes 36. An auxiliary frame 37, is secured by clamps 38, to depending bars 39, and is transversely arranged beneath the main frame. The rake teeth 40 are of lazy-tong construction, each rake having the extreme teeth pivotally connected to the clamp members, 41, which are slidable on the auxiliary frame 37. The rakes are thus adjustable for varying the width of soil that is cultivated, and each rake is laterally and independently adjustably relative the supporting frame.

From the foregoing it may be seen that each element adapted for cultivation of or for turning the soil, is provided with independent vertical and lateral adjustment, relative to its complementary element and to the device as a whole, thus adapting the device to any character of soil to be cultivated, and to any character and width of rows of plants.

The fertilizer distributing means consists of the receptacle 15, which is formed with inwardly sloping and converging walls, all arranged to convey the contents of the receptacle to the two bottom apertures 42, one of which is shown in detail in Fig. 3. Each opening is provided with a slide member 43, arranged to cut off, or to vary the amount of fertilizer distributed. Each slide is provided with a rod 44, in engagement with the turn-buckle 45, rotating in the bracket 46, the arrangement being such that the cut-off slides in each opening are simultaneously and uniformly adjusted for the purpose aforesaid. Above each slide is mounted a rotary agitator 47, each of which is fixed to the shaft 48, having the angular end 49, and mounted on the concentric bearing 22. A bracket 69, on the fixed non-rotating axle 28, has journaled therein the tubular shaft 50, in sliding engagement with end 49, and provided with a pinion 51, in engagement with a gear wheel 52 fixed to and rotating with the main wheel 29. The agitators 47 are thus actuated upon rotation of the main wheel, which rotates as the device is propelled over the ground. The agitators are thus actuated in any transverse adjustment of the main wheels, and serve to prevent clogging of the fertilizer above the distribution openings.

From the distribution openings 42, flexible conduits 53, extend downward to brackets 54, projecting rearward from the plow elements. The nozzles 55, on the ends of the conduits are thus maintained in position at the rear of the plow elements, regardless of their transverse adjustment relative to the receptacle. The nozzle is formed with two end members 56, and foldable side members 57, being thus collapsible similar to a bellows to vary the opening in the nozzle. The fertilizer may thus be dropped in a very narrow row, or distributed the full width of the furrow that is turned by the plow element. A rod 58, connected to one end wall of the nozzle, and extending through the other, has thereon the adjusting nuts 59, 60, respectively, on opposite sides of the lug 61, and the nozzle is adjusted by turning the nuts. The rod 58, serves as a baffle element to more uniformly distribute the fertilizer in the nozzle.

It may be noted that the distributing nozzle is intermediate between the plow elements and the scraper and rake elements, and as the device is propelled along the rows of plants, the soil is first turned by the plow elements, the fertilizer is distributed in the furrow thus formed, and the soil is then scraped and leveled by the scraper or rake, to cover the fertilizer, which is a material advantage in the cultivation of plants, as some fertilizers tend to deteriorate under direct and continued exposure to the sunlight.

At the ends of the rows, should it be desired to turn the delivery of the fertilizer may be cut off quickly by the trap door 62, immediately beneath the adjustable slide, the trap doors being manipulated by a chain 63 which extends to the rear of the receptacle, and engages with pins 64, 65, which determine the open and closed position of the trap doors.

What is claimed is:

1. The combination with a fertilizer receptacle, of bearing members carried thereby, off-set axle members journaled in said bearings, and adapted to swing through a circular arc, means for adjusting the off-set axle members, non-rotating axle members mounted in the off-set axle members and laterally adjustable relative thereto, means for clamping the non-rotative axle members in the laterally adjusted positions, an angular axle member arranged to telescope within the non-rotating axle members and maintain alinement thereof, tractor wheels rotatively mounted on the non-rotating axle members, adjustable conduits extending from the receptacle, rotary agitating means within the conduits, a shaft to actuate the agitating means journaled in the off-set axle members and arranged concentric with said bearing members, brackets extending from the non-rotating shafts, rotary socket members mounted in said brackets and having sliding engagement with said actuating shaft, and gears connecting the tractor wheels and rotary socket member.

2. The combination with a two-wheeled truck, of a fertilizer receptacle carried by the truck, horizontally disposed bars supported from the truck and beneath the receptacle, means for adjusting the bars vertically, a plurality of soil agitating elements arranged with lazy-tong construction and mounted on the horizontal bars and arranged in sets, clamping means for each set and adapted for relative adjustment of the sets laterally, and relative adjustment of the individual agitating elements in each set, conduits passing from the receptacle to the soil agitating elements, collapsible nozzles on the conduits, means to adjust the nozzles in accordance with the adjustment of the soil agitating elements, and baffle elements in the nozzles to secure even distribution therefrom.

3. The combination with a fertilizer receptacle, of tractor means therefor, soil turning elements carried by the tractor means, means for adjusting the soil turning elements relative to the tractor means, conduit means between the receptacle and the soil turning elements, agitating means within the receptacle operated by the tractor means, a scraper supported from the receptacle, means for adjusting the scraper vertically and angularly relative to the conduit means, rake elements supported at the rear of the scraper, means for adjusting the rake elements vertically and laterally and means whereby the agitating means is operated in any adjusted position of the tractor means.

4. A manure spreader adapted to distribute a fertilizer in parallel rows, comprising a receptacle with parallel depressions in the bottom, tractor means for the receptacle, conduits leading from each depression to the ground, agitating means within the receptacle actuated by the tractor means and operative to prevent clogging of the conduits, means for varying the distance between the conduits at their free ends, nozzles on the ends of the conduits, and means for adjusting the nozzles to vary the area of distribution.

5. A frame, a receptacle carried by the frame, axles on the frame, means for adjusting the axles in and out relative to the frame and receptacle, tractor wheels carried by the axles, conduit means extending from the receptacle to a point adjacent to the ground, nozzles for the conduits, means for adjusting the nozzles laterally to vary the distributing area, and means for adjusting the distance between the conduits independently of the tractor wheels.

6. The combination with a frame, of wheels supporting it, a receptacle thereon having two distributing outlets and walls converging toward the outlets, conduit elements extending from the outlets downwardly into proximity with the ground, a slide cut-off in each conduit, means for adjusting the slides simultaneously to vary the capacity of distribution, swinging trap doors in the conduits, means whereby the trap doors may be operated to closed position from the rear of the receptacle, agitating elements in proximity with the receptacle outlets, means for operating the agitating elements from the movement of the tractor wheels, and soil turning elements depending from the frame and operative at the front and rear of said conduits.

In testimony whereof I hereunto affix my signature this 26th day of March, in the year 1918.

YOSHIJIRO SHIRAI.

In presence of—
FREDERIC M. KEENEY,
JAMES W. MASTER.

Copies of this patent may be obtained for five cents each, by addressing the "Commissioner of Patents, Washington, D. C."